United States Patent [19]

Sowinski

[11] Patent Number: 5,354,362
[45] Date of Patent: Oct. 11, 1994

[54] METHOD FOR FILTERING ODORANT FROM A GAS STREAM

[76] Inventor: Richard F. Sowinski, P.O. Box 20006, Martinez, Calif. 94553

[21] Appl. No.: 92,282

[22] Filed: Jul. 15, 1993

Related U.S. Application Data

[63] Continuation-in-part of Ser. No. 926,457, Aug. 7, 1992, abandoned, which is a continuation-in-part of Ser. No. 660,352, Feb. 22, 1991, Pat. No. 5,139,543, and a continuation-in-part of Ser. No. 660,343, Feb. 22, 1991, Pat. No. 5,141,533, and a continuation-in-part of Ser. No. 660,346, Feb. 22, 1991, Pat. No. 5,139,542, and a continuation-in-part of Ser. No. 660,345, Feb. 22, 1991, Pat. No. 5,145,494, and a continuation-in-part of Ser. No. 660,350, Feb. 22, 1991, Pat. No. 5,149,343.

[51] Int. Cl.$^5$ .................. B01D 53/04; B01D 27/04; B01D 39/08
[52] U.S. Cl. ......................................... 95/127; 95/141; 95/287
[58] Field of Search ............... 95/127, 141–147, 95/273, 286, 287; 96/108, 134, 153, 154

[56] References Cited

U.S. PATENT DOCUMENTS

| | | | |
|---|---|---|---|
| 5,139,542 | 8/1992 | Sowinski | 95/273 X |
| 5,139,543 | 8/1992 | Sowinski | 95/273 X |
| 5,141,533 | 8/1992 | Sowinski | 95/273 X |
| 5,145,494 | 9/1992 | Sowinski | 95/273 X |
| 5,149,343 | 9/1992 | Sowinski | 95/273 X |

Primary Examiner—Robert Spitzer
Attorney, Agent, or Firm—Harold D. Messner

[57] ABSTRACT

A method of filtering a natural gas stream, at the end user's home, business or the like, in which at least a single gas appliance is located, is described in which natural gas odorants have been concentrated in the stream at sufficient levels to be a significant health hazard and/or an adverse environmental threat, such method comprising the steps of: (a) introducing the stream to a filter selected from a group that includes at least activated charcoal and/or impingement adsorbing media wherein in the odorant in the gas stream at sufficient levels to be a significant health hazard and/or an adverse environmental threat due to aperiodic loading of the network occurring as a result of dampening effects of compressor-driven equipment and multiple customer outlet usage causing the ordorant to become clumped into packets, is filtered from the gas stream and captured irrespective of mode of transport, (b) passing the filtered natural gas stream to the end user's gas appliance wherein safe use of the energy associated with the natural gas stream occurs, (c) periodically and safely removing the filter of step (a) for disposing of captured odorant, and (d) inserting a new filter in place of the removed filter. In addition to remove odorants from the natural gas stream, the method of the present invention also can remove other types of contaminants previously mentioned and incorporated herein by reference, such as radon.

20 Claims, 3 Drawing Sheets

METHOD FOR FILTERING ODORANT FROM A GAS STREAM

This Application is a continuation-in-part of Ser. No. 07/926,457 for "Method for Filtering Odorant From A Gas Stream", filed Aug. 7, 1992, now abandoned, which was a continuation-in-part of the following Applications all filed Feb. 22, 1991 which contain related subject matter and are hereby incorporated by reference:

Ser. No. 660,352 for "METHOD AND MEANS FOR FILTERING BENZ-A-ANTHTRACENE FROM A GAS STREAM", now U.S. Pat. No. 5,139,543;

Ser. No. 660,343 for "METHOD AND MEANS FOR FILTERING BENZENE FROM A GAS STREAM", now U.S. Pat. No. 5,141,353;

Ser. No. 660,346 for "METHOD AND MEANS FOR FILTERING BENZO-A-PYRENE FROM A GAS STREAM", now U.S. Pat. No. 5,139,542;

Ser. No. 660,345 for "METHOD AND MEANS FOR FILTERING POLY-CHLORINATED BIPHEYLS FROM A GAS STREAM", now U.S. Pat. No. 5,145,494;

Ser. No. 660,350 for "METHOD AND MEANS FOR FILTERING RADON FROM A GAS STREAM", now U.S. Pat. No. 5,149,343.

SCOPE OF THE INVENTION

The present invention relates to a method of filtering. More particularly, it relates to a filtering method to eliminate conventional natural gas ordorants that had been concentrated within a natural gas distribution network at sufficient levels to be a health threat. As a further constraint, the sources of such odorant concentration are identified. It is believed they result from aperiodic loading of such network in which odorants become clumped into packets due to dampening effects of the compressor driven network and multiple customer outlet usage that adds the aforementioned aperiodic loading with the network.

DEFINITIONS

In this Application, "natural gas" means a mixture of gases associated with hydrocarbon accumulation within the earth as well as processed fuel gases derived from petroleum as well as mineral products such as coal in either gas or liquid phases. In some gas line networks, the resulting final gases may be a mixture from these two sources but wherein the essential component consists of methane.

"Sufficient level to be a health threat" means a recognized standard for human health and safety established by authoritative bodies above which cancer or reproductive toxicity in humans results, such bodies to include but not be limited to the U.S. Environmental Protection Agency (EPA), the U.S. Department of Food and Drug Administration (FDA) and the U.S. Department of Commerce. The EPA has set health and safety standards for sulfide type compounds which, if exceeded, would pose a risk to human health.

"Adsorption" means filter media that captures molecules of a gas, liquid or dissolved substance to the filter surface, by adhesion.

"Absorption" means filter media that absorbs molecules of a gas, liquid or dissolved substance to the filter itself, by taking in through pores or interstices.

"Impingement" means filter media that captures molecules of a gas, liquid, solid or a dissolved substance to the filter by physical capture such as by change in velocity.

BACKGROUND OF THE INVENTION

The development of conventional odorants used to identify natural gas have undergone an eventful history. Odorants have been added to an otherwise odorless gas to detect their presence before becoming a hazard. Pintsch gas condensates to odorize water gas were added to most city gas networks in the late 1800's. An investigation of odorants for natural gas was undertaken in 1931 by the U.S. Bureau of Mines in association with the American Gas Association. As a result, eighty-nine substances were evaluated arid properties for fifty-seven were measured, see U.S. Bureau of Mines Monograph No. 4, such substances being incorporated herein by reference.

The American Gas Association has sponsored subsequent research in which more than 300 materials have been screened.

Natural gas at the wellbore, contains enough hydrocarbons higher than ethane or sulfur bearing constituents (e.g., hydrogen sulfide, mercaptans etc.) to be detected easily by smell. But such constituents are removed in dehumidification and other purification processes before entry into the natural gas distribution network.

Odorization of natural gas is usually undertaken for one or more of the following reasons:

(i) Customer protection wherein the user can smell a gas leak and obtain assistance to repair the line or equipment;

(ii) Gas leak detection in the natural gas network;

State regulations wherein more than half of the states in the United States require that natural gas have an odor and most states have adopted the National Fire Protection Association Standards requiring odorants within liquid propane.

However, odorants are known to be dangerous. They are known to be corrosive at elevated temperatures such as found in pilot light lines, burner boxes or combustion chambers and to produce by-products that are toxic and a danger to health. As an example of the latter, mercaptans undergo thermal decomposition to form hydrogen sulfide, polysulfides and the like. Amines (within the system as a moisture scrubber) also acts as a catalyst to increase the efficiency of the above-mentioned reactions.

I have also found that once within a human's body, they do not dissipate and instead build in increments to burden the body to a significant degree, such progression being a function of frequency and level of exposure. While the EPA and various State Agencies may be aware of the problem of odorants in gas lines, they do not think the reported exposure is of sufficient levels to be dangerous. Moreover, odorants concentration levels at a customer-end user's home, business and the like are not monitored.

In such situations, I find that surprisingly large concentrations of natural gas ordorants sporadically occur. Sources of such concentration: dampening effects of the compressor-driven network and multiple customer outlet usage that add to aperiodic loading of the natural gas stream coupled with surprising longevity of the in situ odorants. As a result, natural gas odorants can flow to appliances in the customer's home, or the like at sufficient levels to be a health and/or environmental hazard, i.e., exceed Federal and/or State health and safety standards. Moreover, although the original source of gas odorants is in the gas phase, both liquid and gaseous forms can be transported alone or attach to particulates and form the final end-use contamination levels at the appliance to be used.

Conventional odorants to which the present invention relates include mercaptans, aliphatic sulfides and cyclic carbon sulfur ring compounds aloe or in combination, having potencies resulting from normal concentrations of 0.5 to 1.5 lb per million cubic feet of natural gas used in conventional gas gathering and distribution networks:

| TYPE | CHARACTERISTICS |
| --- | --- |
| MERCAPTANS | TYPICALLY A SH GROUP such as $C_2H_6SH$ |
| | Examples: ethyl, propyl, isopropyl, butyl, teriary butyl and amyl mercaptans. |
| ALIPHATIC SULFIDES (THIOETHERS) | TYPICALLY A SULFUR MOLECULE ATTACHED TO A STRAIGHT CARBON CHAIN |
| | Examples: dimethyl, ethyl, diethyl, propyl, isopropyl sulfides |
| SULFUR RING COMPOUNDS | Examples: thiophane |

SUMMARY OF THE INVENTION

The present invention relates to a method of filtering, adjacent to the end user's home, business or the like such as the adjacent gas distribution and processing system connected to the end user's meter, a gas stream in which a natural gas odorant has been concentrated at sufficient levels to be a significant health and/or environmental hazard. Steps of the invention include:

(a) introducing the natural gas stream to a filter selected from a group that includes at least activated charcoal and impingement adsorbing and absorbing media whereby natural gas odorants concentrated in the gas stream at sufficient levels to a health and/or environmental threat by aperiodic loading of such network in which odorants become clumped into packets due to dampening effects of the compressor-driven equipment and multiple customer outlet usage that add to aperiodic loading of the natural gas stream coupled with surprising longevity of the in in situ odorants, is filtered from the gas stream and captured, (b) passing the filtered natural gas stream to the customer's gas appliance wherein safe use of the energy associated with the stream occurs, (c) periodically and safely removing the filter of step (a) for disposing of the captured natural gas odorants, (d) inserting a new Filter in place of the removed filter of step (c).

DESCRIPTION OF A PREFERRED EMBODIMENT

Figure 1:
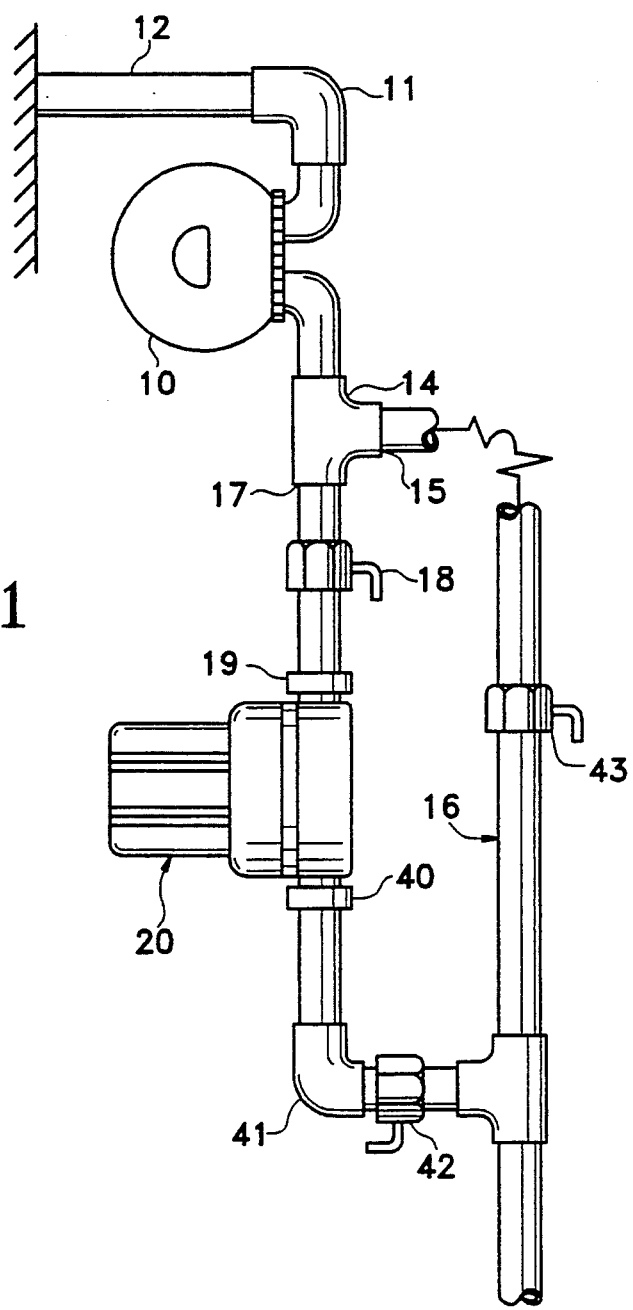
FIG. 1 is side elevation of a gas valve-meter assembly attached at one end to a pipe of a gas line network adjacent to a home, business or the like, along with a filtering assembly and by-pass network of the present invention.

FIG. 1 illustrates a gas meter 10 connected via elbow 11 and gas pipe 12 to a main gas line network (not shown). Downstream of the meter 10 is a tee coupler 14 having a first end 15 connected to an overhead by-pass network generally indicated at 18, and a second end 17 connected through a first valve 18 and inlet fitting 19 to filter assembly 20. The filter assembly 20 in turn connects via outlet fitting 40, elbow 41, and a second valve 42 to the overhead by-pass network 16. As shown, the by-pass network 16 includes a parallel by-pass valve 43. In operation, the by-pass valve 43 operates in complementary fashion with respect to first and second valves 18 and 42, respectively. When valve 43 is closed, as shown, the valves 18 and 42 are open as the filter assembly 20 is in operation. When valve 43 is open, the valves 18 and 42 are closed and the filter assembly 20 is in a deactivated state.

Figure 2:
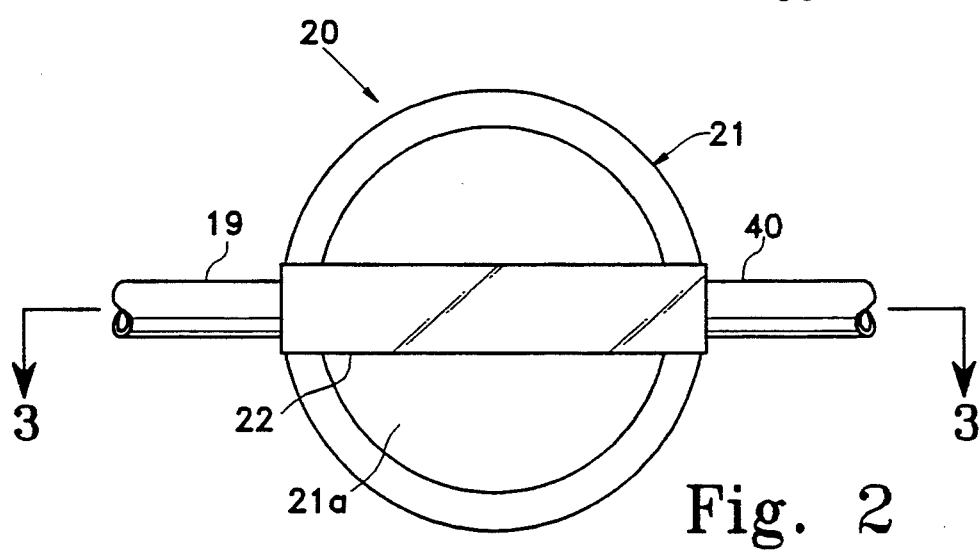
FIG. 2 is a top view of the filtering assembly of the invention.
Figure 3:
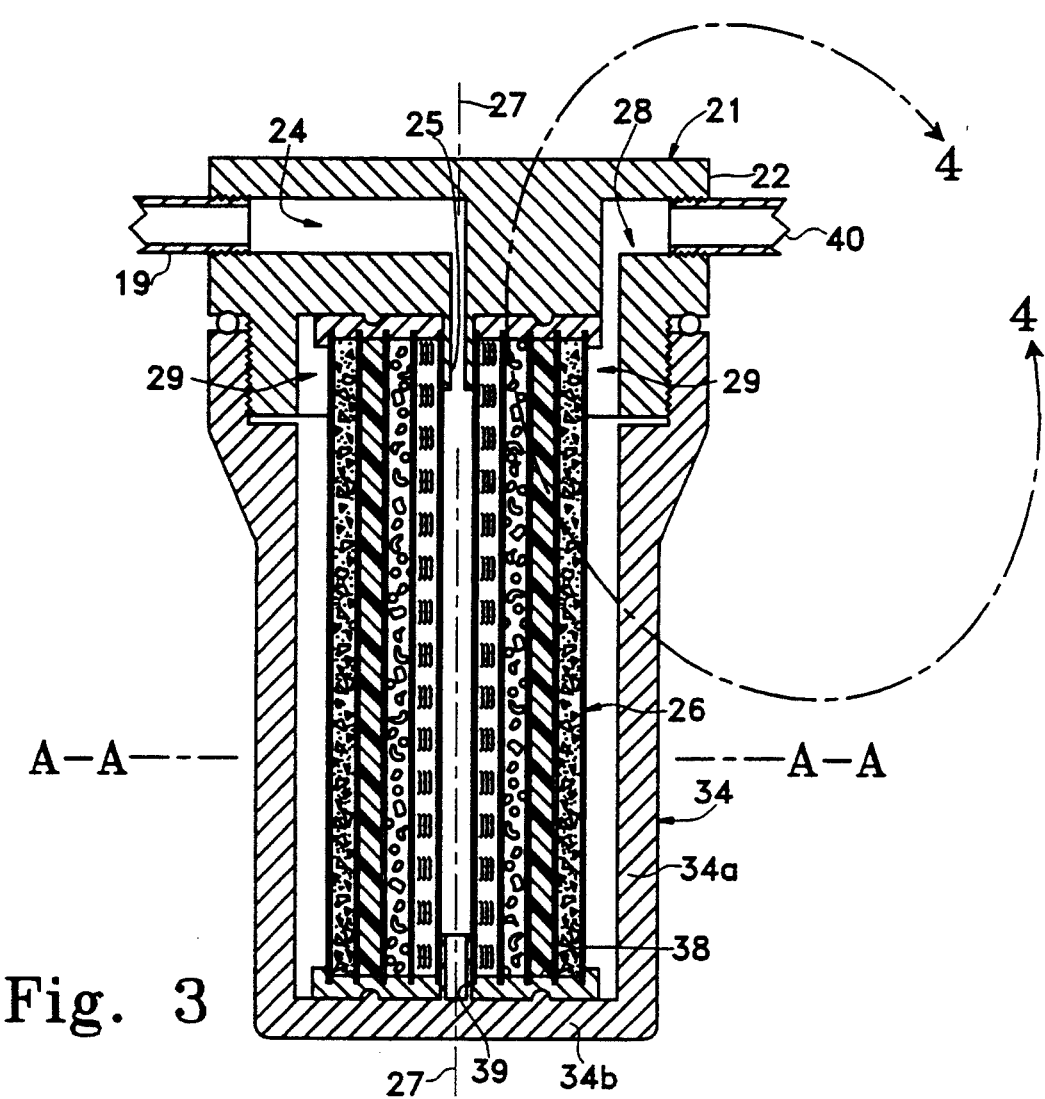
FIG. 3 is a section taken along lines 3—3 of FIG. 2.
Figure 4:
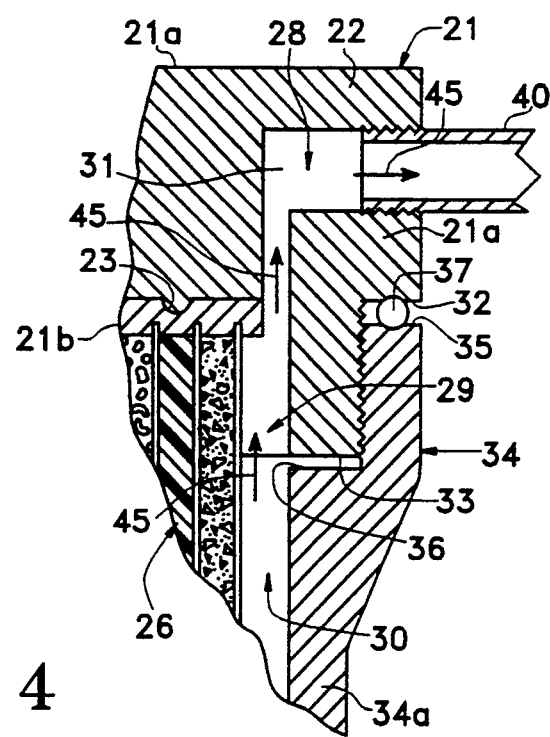
FIG. 4 is an enlarged detail view taken along lines 4—4 of FIG. 3.

FIGS. 2, 3 and 4 show the filter assembly 20 in more detail.

As shown, the filter assembly 20 includes a cap 21 fitted with a rectangularly cross-sectioned dome 22 at its upper surface 21a, see FIGS. 2 and 4, to which the pipe fittings 19 and 40 attach. The cap 21 also has a tower surface 21b fitted with nipples 23 adjacent to a series of passageways that allow entry and egress of the gas stream: ( i ) inlet passageway 24 is L-shaped, is threadably connected to the inlet fitting 19 at one end, and is also connected via central annulus 25 to interior filter media unit 26 concentric of vertical axis of symmetry 27; (ii) an outlet passageway 28 that is bulbous over region 29 but in fluid contact with annular gathering region 30 that runs the full exterior of the filter media unit 26; the passageway 28 is then swedged over region 31 (in a L-shaped output form) at one of bulbous region 29 for connection to outlet fitting 40.

The cap 21 also has an annular side wall 21a, see FIG. 4, and inwardly swedged at shoulder 32 and terminates at end 33. It is threaded therebetween to engage with cylindrical canister 34. The Canister 34 actuates a sidewall 34a offset from the filter media unit 26 to form the annular gathering region 30 previously described and in addition, has shoulders 35 and 36. The region between the shoulders 35, and 36 and is threaded to engage cap 21. Between shoulders 32 and 35 of the cap 21 and canister 34, respectively, is grooved O-ring 37 to prevent gas leakage exterior of the filter assembly 20. The length of the engaging threaded portions of the cap 21 and canister 34 are constructed so that opposite contact exists only at the O-ring 37 and not at shoulders 33, 36.

Canister 34 also includes a bottom wall 34b. The bottom wall 34b includes upwardly projecting nipples 38 concentric of a central annulus 39. The latter attach to the filter housing 26. The purpose of the nipples 23 and central annulus 25 of the cap 21 as well as that of the nipples 38 and central annulus 39 of the canister 34 to fixedly receive and hold the fitter media unit 26 relative to the cap 21 and canister 34.

Note that the direction of the gas stream at the interior of the filter assembly 20 is as taught by arrows 45, see FIG. 4. Such gas stream cannot pass directly from inlet passageway 24 to outlet passageway 28 but is prevented to such flow due to the length of the annuli 25, 39. Thus the gas flow is in a radially expanding, sinusoidal pattern normal to the axis of symmetry 27 about horizontal axis A—A of the filter media unit 26. The pattern begins at the path of symmetry 27 and progresses through filter media unit 26, and ends exterior of the latter at annular gathering region 30. Thus the natural gas odorants are filtered from the stream.

Figure 5:
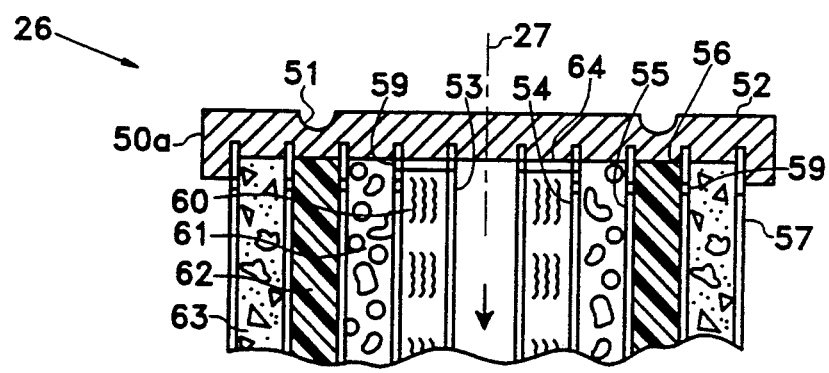
FIG. 5 is an enlarged detail of the filter media unit of FIG. 3.

FIG. 5 illustrates filter media unit 26 in more detail.

As shown, the filter media unit 26 includes end pieces 50a, 50b each having a circular notch 51 at outer surface 52 into which nipples 23, 38 of the cap 21 and canister 34, respectively, are received. Such construction permits the end pieces 50a, 50b to take up firm surface contact with the cap 21 and the canister 34 as the cap 21 is threaded to the latter.

Interior of the end pieces 50a, 50b are a series of concentric tubes 53, 54, 55, 56 and 57 fitted into the notches 51 of the former. The tubes 53-57 have side walls fitted with perforations 59. The side walls are normal to the horizontal axis of symmetry A—A previously mentioned, the latter being also normal to the vertical axis of symmetry 27. The perforations 59 permit gas flow in the sinusoidal-like, single pass filtering manner relative to axis A—A within the tubes 53-57 as indicated by arrows 45. As shown these arrows 45 begin near the vertical axis of symmetry 27 and serpentine outwardly in sinusoidal fashion through the filter media unit 26.

Note that between the tubes 53 and 54; between tubes 54 and 55; between tubes 55 and 56 and between tubes 56 and 57 are separate filter medium 60, 61, 62 and 63 together forming a four-stage, single pass filtering media which in combination remove all traces of the odorant from the gas stream. The media 60-63 are each selected to remove the odorant from the gas stream in progressive fashion, viz., from microscopic to millimicroscopic levels via single passage of the gas stream through each medium 60-63. However, the media 60-63 do not filter the method from the gas stream.

Filter Medium 60

Figure 6:
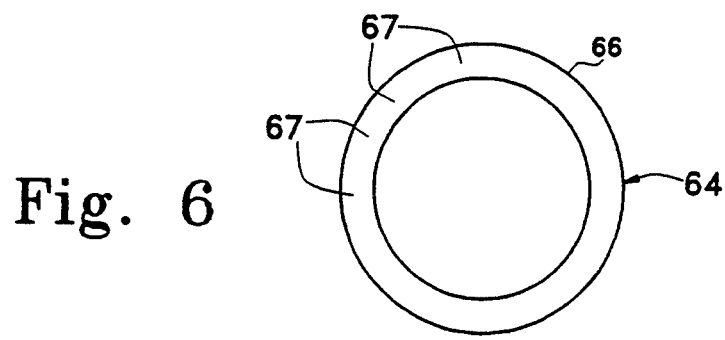
FIG. 6 is an enlarged detail of an insert ring used in the filter media unit of FIG. 3.

In this regard, filter medium 60 is preferably pleated filter paper having the following characteristics. Pleated filter paper 60 is widely available, performs impingement, absorption and adsorption and is made by conventional manufacturing processes including but not limited to methods involving weaving of cellulose, wool, acrylic, rayon fibers into corrugated sheet form. The tips and troughs of the corrugated pleated filter paper 68 of FIG. 5 are located in accordion fashion across and within the tubes 53, 54 but not in contact with the upper and lower end pieces 50a, 50b of the filter media unit. As shown in FIGS. 5 and 6, a separate ring 64 is fitted in contact with each end piece 50a, 50b. The ring 64 of rectangular cross section, includes sidewall 66 and terminating broad surface 67, that is compressively fitted in snug contact with the upper or lower end piece 50a, 50b. As a result, the gas stream circulate in the manner shown and pass through the pleated filter paper 60 in single pass fashion between inlet and outlet perforations 59 associated therewith.

The density of paper 60 varies to provide filtering of the odorant carried on dust, rust, dirt, moisture and oil laden particles in a range of 40 to 750 microns. It also retains both oils and moisture.

Filter Medium 61

In this regard, filter medium 61 is preferably silica gel crystalline form located between tubes 54 and 55.

Silica gel 61 is a conventional drying and dehumidifying agent formed of amorphous silica in crystalline form for filtering and trapping the odorant transported in solution with water, in gaseous form as well as aboard smaller diametered dirt and dust particles carrying the odorant piggyback. The gel absorbs moisture within the gas stream but not oils and is located between tubes 54 and 55. The medium 61 provides for single passage filtering operations only.

Calculations associated with the above are as follows:

Average Natural Gas Usage

Assume average gas use is 125 MSCF/YR, then per month usage cubic meters is 125 mcf/yr/12 = 10,416.6 cu. ft/month/35.3 = 295 cu. meters/month Assume the area between tubes 54, 55 is a function of a mean diameter of 3⅜ inches, a height of 5 inches and thickness of 0.875 inches, then Filter volume = 52.5 cu. inches:

Filter Medium 62

Filter medium 62 is preferably open pore polyurethane foam for capturing gas odorants in gaseous form, Filter medium 62 filters by impingement and adsorption and retains micro vapors and solid particulates including oils and is located between tubes 55 and 56 for single pass filtering operations. It has the following characteristics.

Shape: Cylindrical shape from sheet form

Cellular Matrix Structure

Medium density—0.1 to 0.4 g/cu. cm matrix solid foam to gas insert

Porosity—0.14 to 0.41 (i.e. 70% to 90% open pore polyurethane)

Sample Period—2 months AT 100% Retention
  Well below breakthrough volume, viz., the point at which concentration of solute in the column effluent is half the concentration introduced into the column.

Volatility—Medium, See below

Preparation—Cut from foam sheets; air dry; install.

Pressure—0.015 psi

Calculations associated with the above are as follows:

Assume average gas use is 125 MSCF/YR, then per month usage cubic meters is 125 mcf/yr/12 = 10,416.6 cu. ft/month/35.3 = 295 cu. meters/month where: 0.0364 micro g/cu. meter per meter is gas odorant;

Hence: 295 cu.meter/month produces 10.738 micro g/mo of gas odorant;

And: 0.0027612 cu. cm required to removed above am't of gas odorant

Filter volume = 408.28 cu cm via 5 inches height by ½ inches thickness by 15.7 inches long;

Efficiency—700 cu. meters available

Change frequency = well within above pattern

Filter Medium 63

Furthermore, filter medium 63 is preferably granular activated charcoal located between tubes 56 and 57 for single pass filtering operations.

Granular activated charcoal is a conventional filtering medium, performs filtering on liquids, gases and solid particulates down to 10 Angstroms in size (but does not retain water) by impingement and adsorption and is prepared by carbonization of raw materials such as wood, coconut shell and coal. It attracts and holds the gas odorant irrespective of the mode of transport such as a liquid or gas alone or piggyback aboard dirt and dust particles as well as with liquid plugs.

Physical properties:
Surface Area=600 to 1050 cubic meters per gm
Density=0.92 to 2.0 grams per cubic meter
Effective size=0.8 to 1.5 mm
Pore volume=0.6 to 1.7 cubic cm per gram
Mean diameter=1.2 to 1.7 mm
Sieve Size=No. 8 to No. 40 (U.S. Series)
Iodine No.=640 to 1,000

Calculations associated with the above are as follows:
Assume average gas use in 125 MSCF/YR, then per month usage cubic meters is
125 mcf/yr/12=10,416.6 cu. ft/month/35.3=295 cu. meters/month
Assume the area between tubes 54, 55 is a function of a diameter of 7 inches, a height of 5 inches and a thickness of 0.5 inches, then
Filter volume=55. cu. inches;
Density of GAC=0.30 oz./cu. in
Aviail=16.5 oz.
Requirement to remove the gas odorant associated with 295 cu. meters is well within above change pattern.

Figure 7:
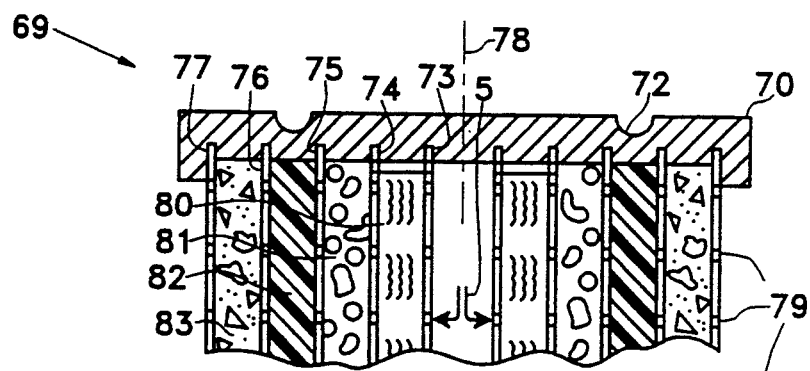
FIG. 7 is an alternate design for the filter unit of FIG. 5.

FIG. 7 illustrates alternate filter media unit 69 in detail.

As shown, the filter media unit 69 is similar to the filter media unit 26 previously described, such filter media unit 69 having end pieces 70, 71 fitted with inwardly facing notches 72 (relative to a horizontal axis of symmetry, not shown), and a series of concentric tubes; 73, 74, 75, 76 and 77 collinear with axis of symmetry 78. However, perforations 79 are provided in side walls of tubes 73–77 to allow radial flow outwardly from vertical axis of symmetry 72. Such construction does not permit the sinusoidal flow as previously mentioned, however. Instead, a gas stream flows as an annular mass through the filter media unit 69 beginning at the axis of symmetry 78 and ending at the exterior of tube 77. Such pattern is indicated by arrows S that are seen to expand outwardly from the axis of symmetry 78. The notches 72 aid in assembly as they take up firm surface contact with the cap 21 and canister 27 of FIGS. 2, 3 and 4, as the former and latter are threaded together.

Between the tubes 73 and 74; between tubes 74 and 75; between tubes 75 and 76, and between tubes 76 and 77 are separate filter medium 80, 81, 82 and 83 together forming a four-stage filtering media which in combination remove the gas odorant from the gas stream. That is, there is 80, 81, 82 and 83 are selected to remove all traces of the gas odorant from the gas stream in the same order and similar filtering capacity as previously discussed with reference to FIG. 5. In this regard, filter medium 80 is pleated paper, medium 81 is silica gel, medium 82 is open pore polyurethane foam and medium 83 is granular activated charcoal each having characteristics as set forth above.

Guidelines for Selection of Filter Media 60–63 & 80–83

Natural gas odorants exist in two states within the gas line network: primarily is a liquid and as a vapor. It is carried along because of the pulsation of the gas stream and surprisingly because of the gas phase transition effects created by the drive compressors of the gas system augmented by the multiple outlet demands of the customers. But no matter how the gas odorant is clumped in the gas stream, the former are trapped within the filter need is 60–63 and 80–83 of the invention.

Gas phase transition is a little understood phenomenon in which various dynamics due to changes in temperature, pressure, pipe size, flow rates that cause interaction between hazardous elements of the gas stream and various other elements in the network, such as pipe coatings, plug flows (aggregations of materials moving as a group) liquids and gaseous phases of constituents of the natural gas stream. As a result, liquids and gases within the natural gas stream surprisingly, change state. The resulting gaseous phase may contain the hazardous elements which are transported great distances.

As a vapor or liquid, the gas odorants to which the invention relates are carried along under like sets of circumstances described above.

Pressure Conditions

As surface residue on solid particulates, gas odorants are carried along as follows. At the well site, pressures in excess of 2,000 psi occur. Such pressure can be maintained until stepped down to approximately 1,000 psi, thence to 60 psi and finally to a range of ½ to 2 psi at the user's residence and to a range of 3 to 5 psi at some user's businesses.

While filter media 60–63 and 80–83 are preferably as discussed above, substitutions can be made. For example, other types of impingement-adsorbing media could be used including silica sand, activated clay such as montmorillanite, natural zeolites composed of hydrous calcium and aluminum silaceous materials, synthetic zeolites called molecular seives such as sodium aluminum silicates, caitlin silt loam, dried corn husks, etc. Also, fluid baths, sonic collectors, electrostatic precipitators and thermal de-humidification devices could also be used.

Other impingement adsorbing media includes other packings such as can be woven, coated or impregnated (such as with glycerol, glycerin, oils, glycol etc.). Other types of filters include membrane filter media for use in natural gas environments generally above 100 psi in which the solute is the force that helps perform the filtering, as well as special filters such as elongated, inter-latticed baffles that provide electrostatic collection such as the HEPA filter (High Efficiency Particle Accumulator for filter, an acronym of the National Aeronautics and Space Administration).

In some applications, fluid baths could be used, in which fluids secreted from a group that includes water, oil, alcohol, glycerol, glycerin, and glycol, could be used. Such use would require a modification to the canister 27 in order to provide a filtering operation.

Further Method Aspects

After installation has occurred, the filter system is an active filtering state for natural gas odorants. That is to say, the valve 43 in the by-pass network 16 is closed and the valves 18 and 42 upstream and downstream of the filtering assembly 20 are opened.

When the filtering assembly 20 is to be re-charged, the valve 43 in the by-pass network is opened so that gas is passing in parallel to the downstream appliances (not shown). This assures ample gas supply before the filtering assembly 20 is deactivated. Such deactivation occurs when the valves 18 and 42 are closed. Then the canister 27 with the filter media 60–63 & 80–83 captured within its side wall 31, is removed from contact with cap 21, and the canister 27 and filter media 60–63 & 80–83 are removed for transport to a waste station and disposal. A new canister 27 with new filter media 60–63 or 80–83 is re-attached.

The above description contains several specific embodiments of the invention. It is not intended that such be construed as limitations on the scope of the invention, but merely as examples of preferred embodiments. Persons skilled in the art can envision other obvious possible variations within the scope of the description. For example, the filter assembly 20 can be inserted in higher pressure lines of the gas transfer network, such as within the local utilities' piping network. Hence the scope of the invention is to be determined by the appended claims and their legal equivalents.

Modification

Radon radioactive decay products can pose an especially potent health risk as disclosed in my U.S. Pat. No. 5,149,343 for "Method for Filtering Radon From a Gas Stream" Sep. 22, 1992. In this regard, a recent study indicates several of the isotope daughters of radon readily adhere to surfaces, including walls, furniture and airborne particles and pose a health risk to both active and passive smokers. (See "SCIENCE NEWS", Aug. 3, 1991, Pg. 79 "ELEVATED RISK FOR PASSIVE SMOKER"). In this regard, I have discovered a surprising high radon risk for humans in association with odorant in natural gas. It is believed such odorant prolongs the stay of such radon daughters as undue and surprising time period. Hence, such daughters remain available for inhalation within the human body as aperiodic loading within the natural gas gathering and distributing network of the radon daughters and odorant occurs.

Radon daughters are known to have an ionic charge. However, only recently their elevated risk in association with cigarette smoke has been documented. In similiar fashion I have discovered that odorant in natural gas and such radon decay products pose independent health risks and together form a potent synergistic duo that pose an unacceptable health risk. Their combination can occur in the distribution system of the natural gas distribution before the radon daughter-odorant combination enters the user's interior distribution subsystem. Hence, when such combination is ignited at the user's appliance, a significant health risk occurs.

What is claimed is:

1. A method of filtering, adjacent to an end user-customer's residence or business in which at least a single gas appliance is located, a natural gas stream in which natural gas odorants have been concentrated at sufficient levels to be an adverse environmental threat in a natural gas gathering and distributing network, comprising the steps of:
    (a) introducing the natural gas stream to a filter selected from a group that includes impingement, absorbing and adsorbing media whereby natural gas odorants concentrated in the gas stream at sufficient levels to be an adverse environmental threat by aperiodic loading of the natural gas within the gathering and distributing network, are filtrated from the gas stream and captured irrespective of mode of transport,
    (b) passing the filtered natural gas stream to the customer's gas appliance wherein safe use of the energy associated with the stream occurs,
    (c) periodically and safely removing the filter of step (a) for disposing of captured natural gas odorants,
    (d) inserting a new filter in place of the removed filter of step (c).

2. The method of claim 1 in which said impingement, absorbing and adsorbing media of step (a) for filtering gas odorants, are selected from the group comprised pleated filter paper, silica gel, open pore polyurethane foam and granular activated charcoal.

3. The method of claim 2 in which said impingement, absorbing and adsorbing media of step (a) comprises in seriatim, pleated filter paper, silica gel, open pore polyurethane foam and granular activated charcoal whereby gas odorants are removed from the natural gas stream.

4. The method of claim 1 in which step (a) is further characterized by aperiodic loading of in situ natural gas odorants being the result of gas phase transition effects occurring within a natural gas gathering and distribution network.

5. The method of claim 4 in which step (a) is further characterized by the natural gas gathering and distributing network including compressor-driven equipment and multiple customer outlets connected to such equipment and by aperiodic loading of in situ gas odorants within natural gas gathering and distributing network being the result of dampening effects of the compressor-driven equipment and multiple customer outlet usage.

6. The method of claim 1 in which the natural gas gathering and distributing network includes gas meters each connected to one of the outlets of the network and wherein said filtering occurs after such gas stream exits from the user's gas meter.

7. The method of claim 1 in which said filtering occurs within the natural gas gathering and distribution network.

8. The method of filtering adjacent to an end-user-customer's residence or business in which at least a single gas appliance is located, a natural gas stream in which gas odorants have been concentrated at sufficient levels to be a health threat within a natural gas gathering and distributing network connected to the customer's gas appliance comprising the steps of:
    (a) introducing the natural gas stream to a filter selected form a group that includes impingement, absorbing and adsorbing media whereby natural gas odorants concentrated in the gas stream at sufficient levels to be a health threat due to aperiodic loading within the natural gas gathering and distributing network, is filtered form the gas stream and captured irrespective of mode of transport,
    (b) passing the filtered natural gas stream to the customer's gas appliance wherein safe use of the energy associated with the stream occurs.

9. The method of claim 8 with the additional steps of:
    (c) periodically and safely removing the filter of step (a) for disposing of captured natural gas odorants,
    (d) inserting a new filter in place of the removed filter of step (c).

10. The method of claim 9 in which the natural gas gathering and distributing network includes gas meters each connected to one of the outlets of the network and wherein steps (a), (c) and (d) occur after the natural gas stream exits from the end user's gas meter.

11. The method of claim 9 in which steps (a), (c) and (d) occur within the natural gas gathering and distribution network.

12. The method of claim 8 in which said impingement, absorbing and adsorbing media step (a) for filtering gas odorants is selected for the group comprising pleated filter paper, silica gel, open pore polyurethane foam and granular activated charcoal.

13. The method of claim 12 in which said impingement, absorbing and adsorbing media of step (a) comprises in seriatim, pleated filter paper, silica gel, open pore polyurethane foam and granular activated charcoal whereby gas odorants are removed from the natural gas stream irrespective of mode of transport.

14. The method of claim 8 in which step (a) further characterized by aperiodic loading if in situ gas odorants being the result of gas phase transitional effects occurring within the natural gas gathering and distributing network.

15. The method of claim 14 in which step (a) is further characterized by the natural gas gathering and distributing network including compressor-driven equipment and multiple customer outlets operationally connected to such equipment and wherein step (a) is also characterized by clumping of in situ odorants that is the result of dampening effects produced by the compressor-driven equipment and multiple customer outlet usage within the natural gas gathering and distributing network.

16. A method of filtering adjacent to an end user-customer's residence or business in which at least a single gas appliance is located, a natural gas stream in which odorant and radon have been concentrated at sufficient levels to a health threat within a natural gas gathering and distributing network connected to the end user-customer's gas appliance, comprising the steps of:
(a) introducing the natural gas stream to a filter selected from a group that includes impingement, absorbing and adsorbing media whereby radon and odorant concentrated in the gas stream at sufficient levels to be a health threat due to aperiodic loading within the natural gas gathering and distributing network, is filtered from the gas stream and captured irrespective of mode of transport,
(b) passing the filtered natural gas stream to the end user-customer's gas appliance wherein safe use of the energy associated with the stream occurs.

17. The method of claim 16 with the additional steps of:
(c) periodically and safely removing the filter of step (a) for disposing of captured radon and odorant,
(d) inserting a new filter in place of the removed filter of step (c).

18. The method of claim 17 in which the natural gas gathering and distributing network includes gas meters each connected to one of a series of outlets of the network and distributing network and wherein steps (a), (c) and (d) occur after the natural gas stream exists from the end user-customer's gas meter.

19. The method of claim 17 in which steps (a), (c) and (d) occur within the natural gas gathering and distributing network.

20. The method of claim 16 in which said impingement, absorbing and adsorbing media of step (a) for filtering radon and odorant is selected from a group comprising pleated filter paper, silica gel, open pore polyurethane foam and granular activated charcoal.

* * * * *